United States Patent [19]

Trap

[11] 3,776,743
[45] *Dec. 4, 1973

[54] GLASS
[75] Inventor: Hendrikus Johan Lodewijk Trap, Emmasingel, Eindhoven, Netherlands
[73] Assignee: U.S. Philips Corporaton, New York, N.Y.
[*] Notice: The portion of the term of this patent subsequent to May 16, 1989, has been disclaimed.
[22] Filed: Apr. 1, 1971
[21] Appl. No.: 130,467

[30] Foreign Application Priority Data
Apr. 16, 1970 Netherlands.................... 7005457

[52] U.S. Cl..................................... 106/53, 106/54
[51] Int. Cl......... C03c 3/10, C03c 3/04, C03c 3/30
[58] Field of Search........................ 106/53

[56] References Cited
UNITED STATES PATENTS
3,470,002    9/1969   DiMarcello et al................. 106/49

Primary Examiner—A. B. Curtis
Assistant Examiner—Mark Bell
Attorney—Frank R. Trifari

[57] ABSTRACT

Glass which after adjustment of the surface conductivity by heating in a reducing atmosphere is particularly suitable for use in a continuous channel dynode and which has a composition within the following limits in percent by weight:

| | | | | |
|---|---|---|---|---|
| $SiO_2$ | 20–48 | | $PbO$ | 25-35 |
| | | | | combined |
| $Al_2O_3$ | 5 | | $Bi_2O_3$ | 10-35  45–70 |
| $B_2O_3$ | 3 | | $CaO+SrO$ | 8 |
| $Na_2O$ | 4 | Combined | $MgO$ | 7 |
| $K_2O$ | 5 | 2–8 | $Sb_2O_3$ | 2 |
| $Li_2O$ | 5 | | | |

1 Claim, No Drawings

GLASS

The invention relates to a range of glass compositions which are particularly suitable for use in a continuous channel dynode. This dynode consists of a body having two parallel end boundary faces and being provided with a plurality of channels which are either or not at right angles to the said end boundary faces and which are open at both ends. Both end boundary faces are coated with an electrically conducting layer and a voltage difference is applied therebetween. Under the influence of the electric field thus obtained electrons move through the said channels from one side of the electrode to the other.

The walls of the channels consist of a material having a suitable surface resistance which has a secondary emission factor of more than 1 at the electron speed caused as a result of the conventional voltage difference. Consequently, for each electron impinging upon the wall an average of more than one electron returns.

Several methods are known for the manufacture of a glass body for such a dynode which has a diameter of for example 3 to 10 cm and a thickness of 1 to 2½ mm and a plurality of apertures of $10^5$ per sq.cm having an average diameter of approximately 20 μ per aperture.

The method starts from a glass tube which is drawn out while being heated. The obtained tubes are bundled and the assembly is again drawn out, bundled and combined in a jig and heated until the material of the walls of the tubes is mutually connected together and fills up the interstices by flowing together of the material.

Since it is difficult to avoid damage, deformation or blocking of the channels during drawing out and flowing together, the method used as the most attractive embodiment is the one according to which a core is present in the tubes. This technique has the additional advantage that the bundle can be heated under a high pressure so that a better mutual flowing together of the tubes takes place. After completion of the glass body, this core is removed from the dynode. One of the core materials most frequently used consists of thin metal wire, for example, molybdenum wire having a diameter of 20 μ. This wire is coated with a layer of the desired glass by passing it through a bath containing the molten glass, cutting it into pieces after cooling, bundling it, melting the assembly together and subsequently removing the core by chemical process.

A range of glass compositions has been discribed in prior United Kingdom Pat. application No. 54,437/69 not yet published in the name of the applicant (U.S. Pat. application Ser. No. 873,091 now U.S. Pat. No. 3,663,247), which range may be used on its own, that is to say, without a substrate glass for the manufacture of a dynode in accordance with the above-described technique while using metal wire as a temporary core. It is true that these glasses melted in an oxidizing atmosphere do not have the required level of the electrical conductivity but this conductivity is achieved by means of a reducing post-treatment at an increased temperature of the finished glass body for the dynode.

The said glasses have a composition within the range limited as follows in percent by weight:

| | | | | |
|---|---|---|---|---|
| $SiO_2$ | 30–70 | PbO | | 6–30 |
| $Al_2O_3$ | 0.5–10 | $Bi_2O_3$ | | 2–45 |
| $B_2O_3$ | ≤ 5 | CaO+SrO | ≤ | 8 |
| $Na_2O$ | ≤ 6 | MgO | | 0.5–7 |
| $K_2O$ | ≤ 10 | $Sb_2O_3$ | ≤ | 2 |

It was found that when the completed glass body subjected to the above-mentioned reducing post-treatment was not soon further processed to a finished dynode, but was preserved in air for some time, in the order of several weeks, an inadmissible large variation of the surface resistance of the material occurs on the inner sides of the channels.

The present invention provides a class of glasses which do not have this drawback.

The glasses according to the invention are characterized in that they have a composition within the range limited as follows in percent by weight.

| | | | | |
|---|---|---|---|---|
| $SiO_2$ | 20–48 | PbO | 25–35 | combined 45–70 |
| $Al_2O_3$ | ≤ 5 | $Bi_2O_3$ | 10–35 | |
| $B_2O_3$ | ≤ 3 | CaO+SrO | ≤ 8 | |
| $Na_2O$ | ≤ 4 combined 2–8 | MgO | ≤ 7 | |
| $K_2O$ | ≤ 5 | $Sb_2O_3$ | ≤ 2 | |
| $Li_2O$ | ≤ 5 | | | |

Four glasses according to the invention (nos. 2, 3, 5 and 6) are given by way of example in the Table below together with their softening points (S; this is the temperature at which the viscosity is $10^{7.6}$ poises) in °C and the value of log α right after the reducing treatment at an optimum temperature. The symbol represents the specific surface resistance in ohms per square surface. The Table also states the variation of the surface resistance $1/α \cdot dα/dt$ wherein $t$ is the time in hours. Finally the Table states two compositions 1 and 4 having an admissible variation of the resistive value.

| Number | Composition in percent by weight | | | | | | | | S (°C.) | log α (t=0) | $10^4 \cdot \frac{1}{α} \cdot \frac{dα}{dt}$ |
|---|---|---|---|---|---|---|---|---|---|---|---|
| | $SiO_2$ | $Al_2O_3$ | $Na_2O$ | $K_2O$ | PbO | $Bi_2O_3$ | $Sb_2O_3$ | $Li_2O$ | | | |
| 1 | 31.5 | 0.4 | 1.5 | 1.5 | 64.2 | | 1.0 | | 553 | 12.45 | 147 |
| 2 | 31.4 | 0.4 | 1.4 | 1.5 | 51.2 | 13.2 | 1.0 | | 562 | 7.95 | 8.5 |
| 3 | 25.3 | 0.4 | 1.6 | 1.6 | 41.9 | 28.2 | 1.0 | | 574 | 7.34 | 4.5 |
| 4 | 43.9 | 1.1 | 3.7 | 6.7 | 24.8 | 19.2 | 0.6 | | 630 | 11.3 | 44.9 |
| 5 | 46.0 | 1.2 | 3.9 | | 26.0 | 20.1 | 0.6 | 2.2 | 586 | 11.3 | 19.8 |
| 6 | 46.9 | 1.2 | | | 26.5 | 20.5 | 0.7 | 4.2 | 615 | 11.3 | 15.0 |

Molybdenum wire having a thickness of 20 μ and surrounded by a tube of one of the glasses 2, 3, 5 or 6 was jointly passed through a vertical furnace, the wire moving at a faster rate than the tube. Just before emerging from the furnace, both were melted together and the glass layer obtained a thickness of 20 μ. This coated wire was wound on a drum provided with recesses. The wire reel was cut off on the recesses at a later stage. The obtained fibres were bundled, placed in a jig and subsequently heated under pressure, until the fibres had melted together and the interstices were filled up. The bundles were sawn to sheets having a thickness of 1.5 mm.

The molybdenum wires were subsequently electrolytically dissolved in weak alkaline bath containing ammonia and sodium hypochlorite at a clamping voltage of 6 volts and under reversal of the current direction over a period of 10 seconds. Sebsequently the obtained glass body was thoroughly rinsed, dried and heated for 2 hours at a temperature of between 300° and 400 °C in a hydrogen atmosphere and finally it was provided with metal claddings on both sides by means of vapour deposition.

What is claimed is:

1. Glass which is particularly suitable for use in a continuous channel dynode after adjustment of the surface conductivity by heating in a reducing atmosphere, consisting essentially of the following composition in percent by weight.

| | | | | |
|---|---|---|---|---|
| $SiO_2$ | 20–48 | $PbO$ | 25–55 | |
| $Al_2O_3$ | $\leq$ 5 | $Bi_2O_3$ | 10–35 | combined 45–70 |
| $B_2O_3$ | $\leq$ 3 | $CaO+SrO$ | $\leq$ 8 | |
| $Na_2O$ | $\leq$ 4 | | | |
| $K_2O$ | $\leq$ 5 | combined 2–8 | $MgO$ | $\leq$ 7 |
| $Li_2O$ | $\leq$ 5 | | $Sb_2O_3$ | $\leq$ 2 | wherein said glass has a secondary emission factor greater than 1 and a controlled time change of surface conductivity after said heating in a reducing atmosphere.

* * * * *

PO-1050
(5/69)

UNITED STATES PATENT OFFICE
CERTIFICATE OF CORRECTION

Patent No. 3776743      Dated December 4, 1973

Inventor(s) HENDRIKUS JOHAN LODEWIJK TRAP

It is certified that error appears in the above-identified patent and that said Letters Patent are hereby corrected as shown below:

Columns 1 and 2, between lines 38 and 47
    Line number 1 under $Na_2O$, "1.5" should read --1.4--
    Line number 2 under $Bi_2O_3$, "13.2" should read --13.1--

Signed and sealed this 16th day of April 1974.

(SEAL)
Attest:

EDWARD M. FLETCHER, JR.
Attesting Officer

C. MARSHALL DANN
Commissioner of Patents